(12) United States Patent
Yamaguchi et al.

(10) Patent No.: US 7,976,091 B2
(45) Date of Patent: Jul. 12, 2011

(54) REAR VEHICLE BODY STRUCTURE

(75) Inventors: Toshizumi Yamaguchi, Wako (JP); Hiro Nushii, Wako (JP); Takumi Tsuyuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 12/365,443

(22) Filed: Feb. 4, 2009

(65) Prior Publication Data

US 2009/0195030 A1  Aug. 6, 2009

(30) Foreign Application Priority Data

Feb. 6, 2008  (JP) .................................. 2008-026143

(51) Int. Cl.
*B62D 43/00*  (2006.01)
(52) U.S. Cl. ..................................... 296/37.2; 224/42.12
(58) Field of Classification Search ................. 296/37.2, 296/37.3, 187.11, 203.01, 203.04; 280/784, 280/785; 224/42.12, 42.13
See application file for complete search history.

(56) References Cited

U.S. PATENT DOCUMENTS

| 2007/0029841 | A1* | 2/2007 | Asahi et al. | ............. 296/203.04 |
| 2008/0277968 | A1* | 11/2008 | Egawa et al. | ............ 296/193.08 |

FOREIGN PATENT DOCUMENTS

| JP | 2000-001185 | 1/2000 |
| JP | 2004-314673 | 11/2004 |
| JP | 2006-193046 | 7/2006 |

* cited by examiner

*Primary Examiner* — Lori L Lyjak
(74) *Attorney, Agent, or Firm* — Rankin, Hill & Clark LLP

(57) ABSTRACT

In a rear vehicle body structure, a spare tire is received in a spare tire pan in a rear end up slanted orientation, the front end of the spare tire is prevented from forward movement by a spare tire pan cross member, and a rear bottom of the spare tire pan is reinforced. At the time of a rear end crash, the spare tire is tilted substantially to an upright orientation around the front end, and the spare tire pan is deformed in such that the rear bottom folded upon a front bottom wall in the shape of letter Z as seen from side so that the spare tire pan provides a long deformation stroke, and is utilized for absorbing the impact energy of the rear end crash. Preferably, the rear bottom comprises an elevated horizontal part and a stepped portion defining a front edge of the elevated horizontal part.

9 Claims, 5 Drawing Sheets

Fig.5
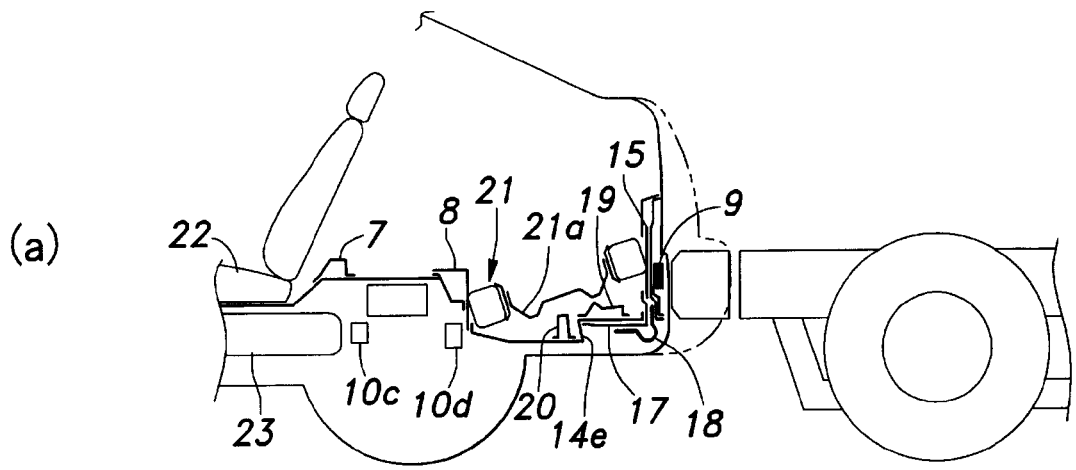
(a)
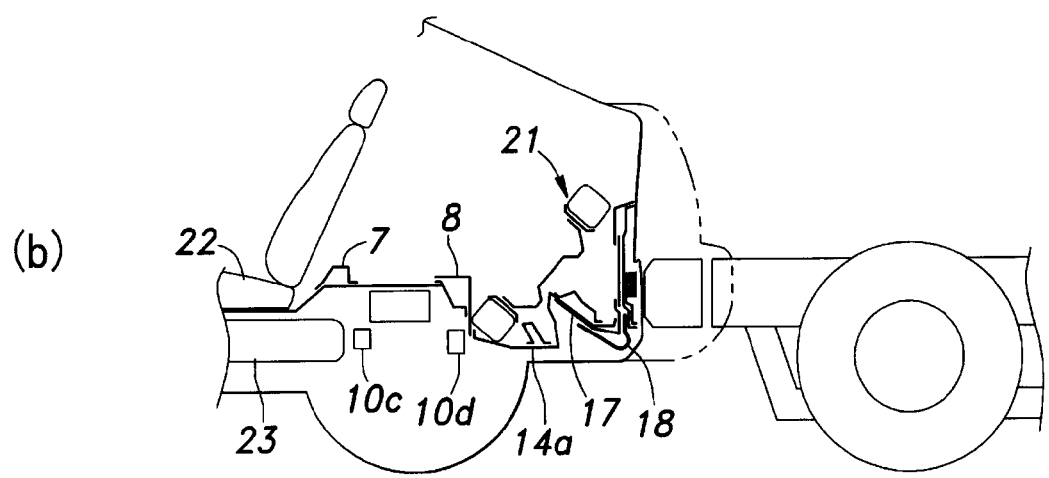
(b)
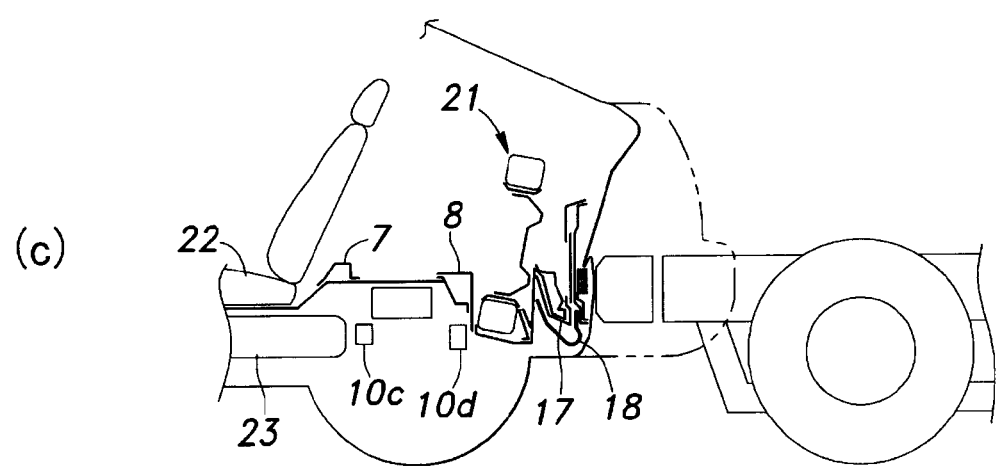
(c)

REAR VEHICLE BODY STRUCTURE

TECHNICAL FIELD

The present invention relates to a rear vehicle body structure, and in particular to a rear vehicle body structure that includes a spare tire pan for receiving a spare tire therein.

BACKGROUND OF THE INVENTION

A passenger vehicle is typically provided with a spare tire pan in a rear part of the vehicle body. As the current vehicle body typically has a monocoque structure combining a number of sheet steel pieces having relatively small thicknesses, it is a challenge to achieve a required mechanical strength and rigidity against a rear end crash while forming a space for receiving a spare tire.

The rigidity and mechanical strength of a vehicle body can be increased by increasing the thickness of the sheet steel, but it has the disadvantage of increasing the manufacturing cost, impairing the fuel economy and lowering the dynamic performance of the vehicle. Therefore, there have been various proposals to increase the mechanical strength of a rear part of a vehicle without increasing the thickness of the sheet steel that is used.

In the vehicle body structure disclosed in Japanese patent No. 3620288, a cross member for supporting a wheel suspension system is provided immediately ahead of a spare tire pan formed by downwardly recessing a rear floor panel between a pair of rear side frames. The spare tire is received in the spare tire pan in a horizontal orientation. Another cross member for supporting a seat catcher for engaging a rear seat is provided ahead of this cross member. These two cross members jointly form a region which is highly resistant to deformation while the spare tire pan is formed as a more readily deformable part so that the spare tire may tilt downward around the front end thereof at the time of a rear end crash. Thereby, the impact energy of the rear end crash can be favorably absorbed in a stable manner.

In the rear vehicle body structure disclosed in Japanese patent laid open publication (kokai) No. 2004-314673, a spare tire pan is slanted with the forward end down, and a front vertical wall of the spare tire pan is connected to a horizontal front floor panel. A slanted upright wall member is connected between the front floor panel and front vertical wall so as to form a closed cross section along the junction between front floor panel and front vertical wall. Thereby, the reinforced front vertical wall of the spare tire pan is given with an increased rigidity so as to protect a fuel tank located ahead of the front vertical wall against the impact of a rear end collision without unduly reducing the space available for the fuel tank.

In the example disclosed in Japanese patent laid open publication (kokai) No. 2006-193046, a spare tire is received horizontally in a spare tire pan defined by recessing a part of a rear floor panel, and the spare tire pan is reinforced by a longitudinal member attached to the lower surface of the rear floor panel. The rear end of the longitudinal member is spaced from a vertical wall of a rear end panel. According to this arrangement, when an impact is received from the rear, the spare tire is prevented from being dislodged, and caused to be tilted so as to effectively absorb the impact.

These prior inventions have various shortcomings. If the rear vehicle body structure is configured to drop the rear end of a spare tire at the time of a rear end collision as proposed in Japanese patent No. 3620288, the deformation of the spare tire pan cannot be effectively utilized for the absorption of the impact energy of a rear end collision, and this limits the capability of the rear vehicle body to effectively absorb the impact energy at the time of a rear end collision particularly when hit by a tall vehicle having a front bumper at a relatively high position.

According to the invention disclosed in Japanese patent laid open publication (kokai) No. 2004-314673, the rear end of the spare tire pan is raised without fail upon receiving the impact of a rear end collision. However, because the front vertical wall of the spare tire pan hangs over the front part of the spare tire, the spare tire is caught by this overhang as the rear end thereof is raised due to the impact of a rear end collision, and the rear end of the spare tire can be raised only to a limited extent. Therefore, the deformation stroke of the rear vehicle body is limited by such a behavior of the spare tire at the time of a rear end collision. Also, because of the absence of a cross member that connects the rear frames with each other, the impact of an offset rear end collision is not favorably distributed to the rear vehicle body.

According to the invention disclosed in Japanese patent laid open publication (kokai) No. 2006-193046, the spare tire is disposed horizontally and is fixedly secured to the floor panel, and the spare tire may be raised at the time of a rear end collision but only to a limited extent because a reinforcement member resists the rising movement of the spare tire. As a result, the deformation stroke at the time of a rear end collision is limited. Because of the absence of a cross member that connects rear parts of rear frames, the impact of an offset rear end collision is not favorably distributed to the rear vehicle body. These problems are particularly acute in the case of a hatchback passenger vehicle which does not have a bulkhead separating a passenger compartment from a luggage compartment, and has rear seats located relatively close to the rear end of the vehicle body.

These problems may be alleviated by increasing the mechanical strength of the rear side frames, but the rear side frames are capable of supporting loading that is applied to a limited region of the vehicle body, and may not be adequately able to support the load of a rear end collision depending on the way the rear end collision occurs.

BRIEF SUMMARY OF THE INVENTION

In view of such problems of the prior art, a primary object of the present invention is to provide a rear vehicle body structure which provides a large deformation stroke at the time of a rear end collision.

A second object of the present invention is to provide a rear vehicle body structure which is able to withstand a rear end collision by a taller vehicle.

A third object of the present invention is to provide a rear vehicle body structure which can favorably distribute an impact load caused by a rear end collision.

According to the present invention, such an object can be accomplished by providing a rear vehicle body structure, comprising a pair of rear side frames extending in a fore-and-aft direction in a rear part of a vehicle body, and a rear floor panel attached to and supported by the rear side frames. The rear floor panel defining a spare tire pan that bulges downward between the rear side frames and configured to receive a spare tire therein with a rear end up slanted orientation. The rear vehicle body structure further comprising a spare tire pan cross member extending laterally across a width of the vehicle body immediately ahead of the spare tire pan and having two ends connected to the rear side frames, and a reinforcing member attached to a rear bottom of the spare tire pan.

Because the spare tire is received in the spare tire pan in a rear end up slanted orientation, the front end of the spare tire is prevented from forward movement by the spare tire pan cross member, and the rear bottom of the spare tire pan is reinforced, at the time of a rear end crash, the spare tire is enabled to be tilted substantially to an upright orientation around the front end thereof, and the spare tire pan is deformed in such a manner that the rear bottom thereof is caused to be folded upon a front bottom wall thereof in the shape of letter Z as seen from side so that the spare tire pan provides a long deformation stroke, and is effectively utilized for absorbing the impact energy of the rear end crash.

This mode of deformation can be effected in a reliable manner if the rear bottom of the spare tire pan is elevated in relation to a front bottom of the spare tire pan. Typically, the rear bottom comprises an elevated horizontal part and a stepped portion defining a front edge of the elevated horizontal part. The stepped portion forms a relatively unreinforced portion, and this ensures the deformation of the spare tire pan to be effected as designed. Preferably, the spare tire pan comprises a pair of side bottoms that substantially linearly slope downward toward front.

The rear bottom of the spare tire pan can be reinforced in many different ways. According to a preferred embodiment of the present invention, the reinforcing member comprises a jack up stiffener attached to a lower surface of the rear bottom of the spare tire pan. The jack up stiffener may be made of stamp formed sheet steel, or a solid steel rod which may include a rear part that is bent upward and attached to a rear panel of the vehicle body. Additionally or alternatively, the reinforcing member may comprise a bracket attached centrally to an upper surface of the elevated rear bottom of the spare tire pan that has a downward sloping surface engaging a part of a spare tire received in the spare tire pan.

BRIEF DESCRIPTION OF THE DRAWINGS

Now the present invention is described in the following with reference to the appended drawings, in which:

FIGS. 5a to 5c are simplified views showing the mode of deformation of the rear vehicle body resulting from a rear end crash at different stages.

DETAILED DESCRIPTION OF THE PREFERRED EMBODIMENTS

Figure 1:
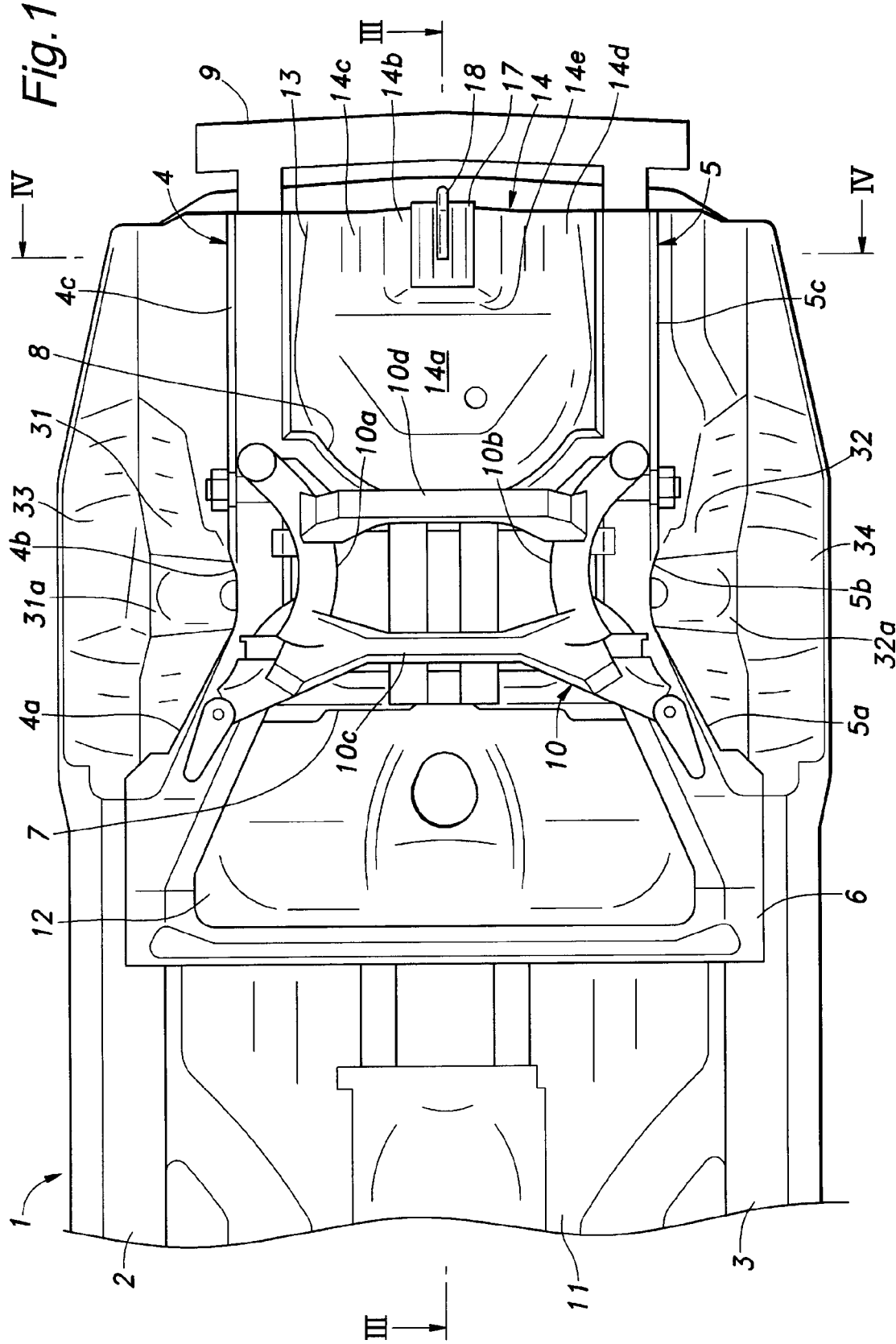
FIG. 1 is a bottom view of a rear vehicle body structure embodying the present invention.
Figure 2:
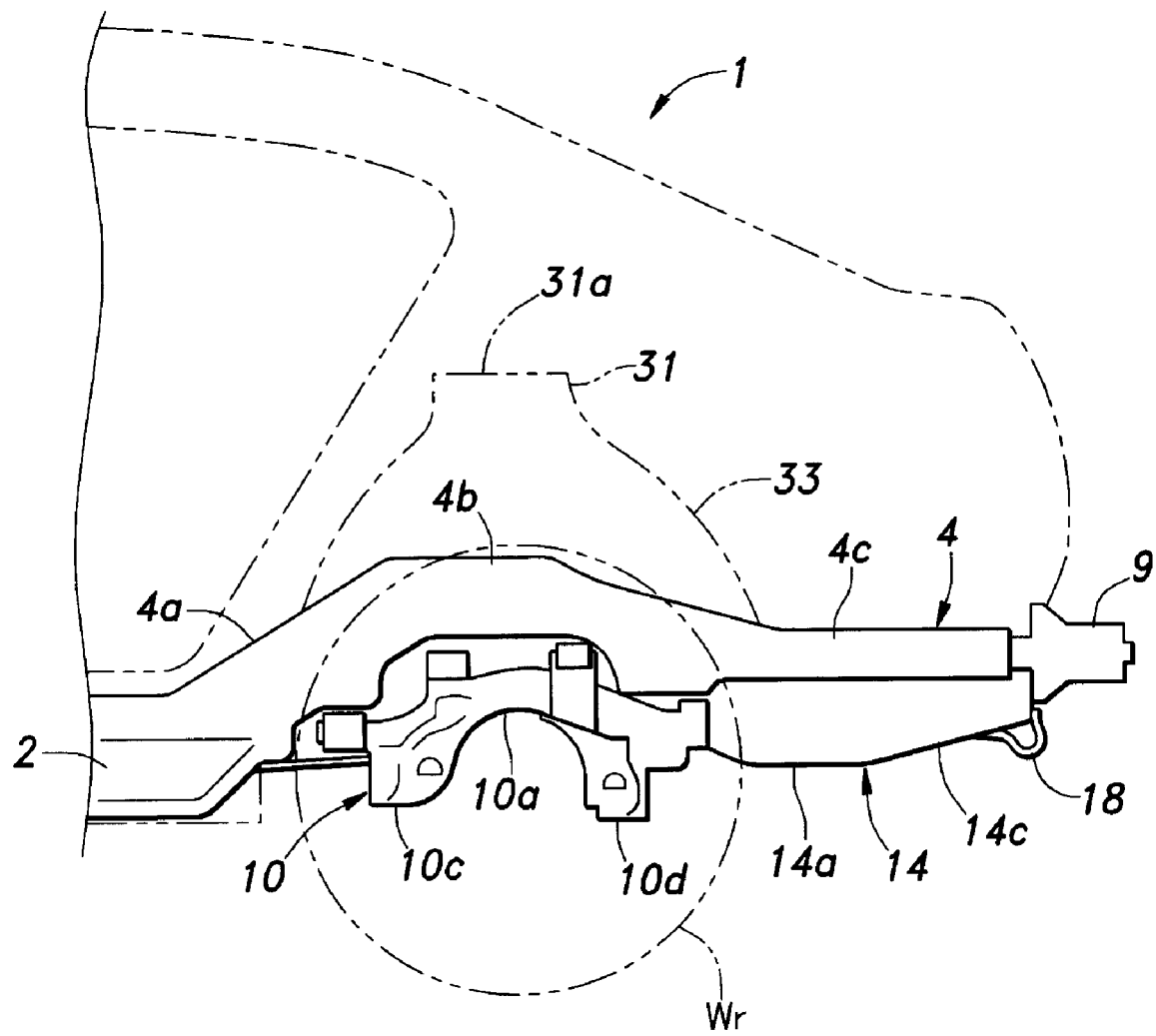
FIG. 2 is a simplified side view of the vehicle body shown in FIG. 1.
Figure 3:
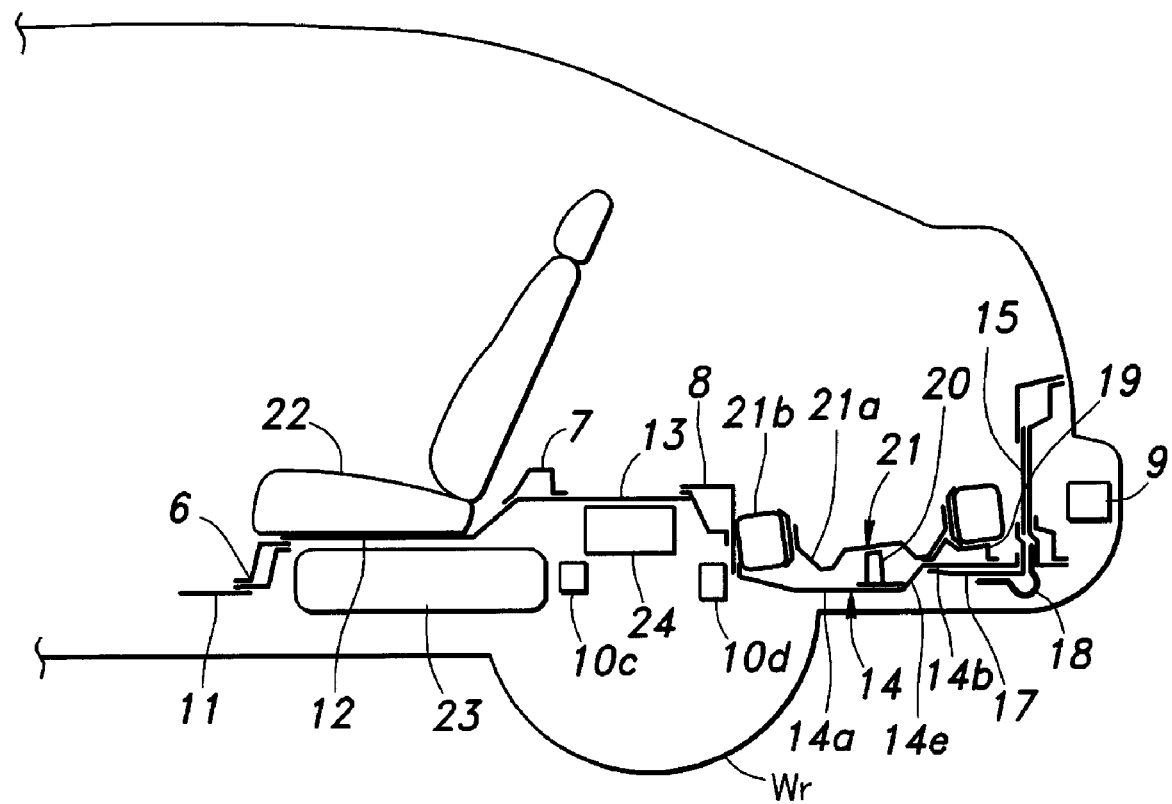
FIG. 3 is a sectional view taken along line III-III of FIG. 1.

FIG. 1 is a bottom view of a rear vehicle body structure embodying the present invention. FIG. 2 is a simplified side view of the vehicle body shown in FIG. 1. FIG. 3 is a sectional view taken along line III-Ill of FIG. 1. This vehicle body 1 comprises, for a floor frame structure thereof, a pair of side sills 2 and 3 extending along either side of the vehicle body, a pair of rear side frames 4 and 5 extending from the rear ends of the corresponding side sills 2 and 3, a middle floor cross member 6 extending laterally across the width of the vehicle body and connecting the rear ends of the side sills 2 and 3 to each other, a rear floor cross member 7 connecting middle portions 4b and 5b of the rear side frames 4 and 5 to each other, and a spare tire pan cross member 8 connecting rear portions 4c and 5c of the rear side frames 4 and 5 to each other.

The front end of each rear side frame 4, 5 is attached to an inboard side of the corresponding side sill 2, 3 with a certain overlap, and the rear side frame 4, 5 is given with an inward and upward curve in a front part thereof and a downward curve in a middle part thereof while the remaining part thereof extends to a rear end thereof in a fore-and-aft direction. Thus, each rear side frame 4, 5 is given with an upwardly convex arcuate section in a front part thereof corresponding to the rear wheel and a substantially horizontal section in a rear part thereof, as seen from side. A bumper beam 9 extending laterally across the width of the vehicle body is attached to the rear ends of the rear side frames 4 and 5.

To lower sides of middle portions 4b and 5b is attached a sub frame 10 that supports the rear wheel suspension system of the vehicle. The sub frame 10 includes a pair of longitudinally extending side frame portions 10a and 10b and a front and rear cross frame portion 10c and 10d e extending across the side frame portions 10a and 10b. From the side frame portions 10a and 10b extend four arms including two front arms attached to the lower sides of the front ends of the rear side frames 4 and 5 and two rear arms attached to the lower sides of the middle portions of the rear side frames 4 and 5. The rear cross frame portion 10d is disposed immediately under the spare tire pan cross member 8.

The vehicle body 1 includes, for its floor panel, a front floor panel 11 attached to the upper sides of the side sills 2 and 3 and forming the floor of the passenger compartment ahead of the middle floor cross member 6, a middle floor panel 12 forming the floor of the passenger compartment behind the middle floor cross member 6 and a rear floor panel 13 attached to the upper sides of the rear side frames 4 and 5 and forming the floor of the luggage compartment. The rear floor panel 13 is formed with a spare tire pan 14 that bulges downward to receive a spare tire 21 therein in a rear part thereof. These frame members and panel members may each consist of a single piece or a plurality of pieces of sheet steel.

Each rear side frame 4 and 5 is formed with a wheel house 33, 34 which is in turn integrally formed with a rear damper housing 31, 32. An upper part of each rear damper housing 31, 32 is fitted with a corresponding rear damper base 31a, 32a that supports a corresponding damper unit for the wheel suspension system not shown in the drawings. The force acting upon each rear wheel Wr is transmitted to the vehicle body 1 via the corresponding damper unit and rear damper base 31a, 32a.

Figure 4:
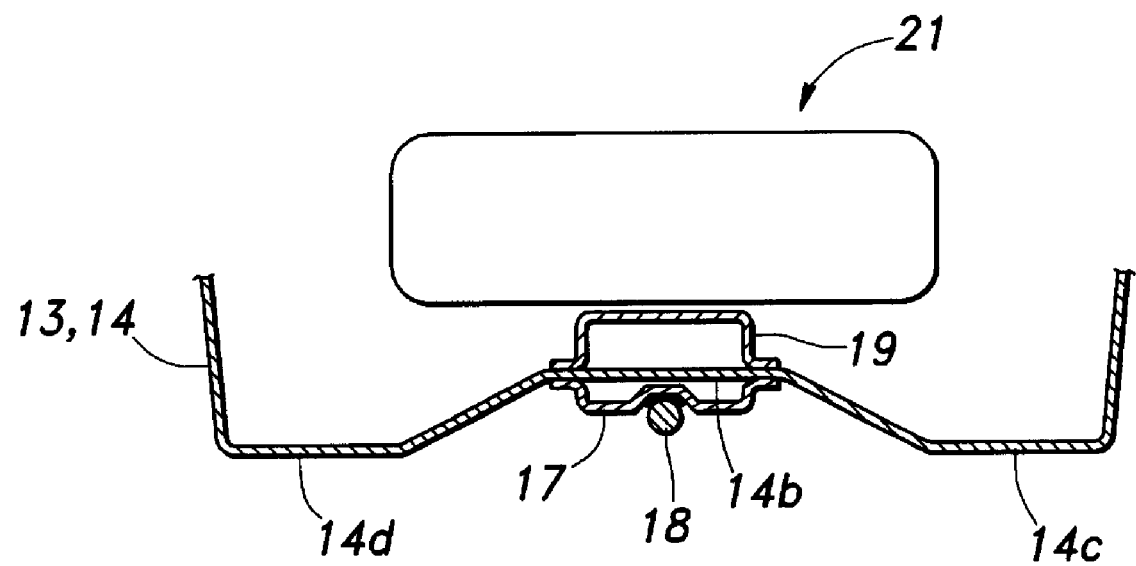
FIG. 4 is a sectional view taken along line IV-IV of FIG. 1.

FIG. 4 is a sectional view taken along line IV-IV of FIG. 1. As shown in FIGS. 1 to 4, the spare tire pan 14 has a substantially horizontal front bottom 14a, a pair of side bottoms 14c and 14d substantially linearly sloping upward toward the rear and a substantially horizontal rear bottom 14b which is somewhat more elevated than the front bottom 14a. Therefore, a stepped portion 14e having a certain lateral width is defined along a front edge of the rear bottom 14b.

To the lower side of a laterally central part of the rear bottom 14b is attached a jack up stiffener 17 and a jack up rod 18 for the convenience of jacking up the rear part of the vehicle. The jack up stiffener 17 is made of steel sheet bent into the shape of letter W as seen from front, and defines a pair of grooves extending in the fore-and-aft direction. The jack up stiffener 17 reinforces the rear bottom part 14b of the spare tire pan 14 against a fore-and-aft force and a vertical force. The jack up rod 18 extends in the fore-and-aft direction and is attached to the central bottom side of the jack up stiffener 17 between the two grooves. The rear end of the jack up stiffener 17 is bent perpendicularly upward, and attached to a rear panel 15. Likewise, the rear end of the jack up rod 18 is bent perpendicularly upward, and is interposed and fixedly secured between the rear panel 15 and jack up stiffener 17. The rear end bend of the jack up rod 18 is suitably curved and projects in a rearward and downward direction.

A bracket 19 for supporting a rear part of the spare tire 21 is attached to the upper surface of a laterally middle part of the rear bottom 14b of the spare tire pan 14. The spare tire 21 consists of a wheel 21a made of stamp formed steel plate and a pneumatic tire 21b made of rubber and fitted around the wheel 21a. The spare tire pan 14 is configured to receive the spare tire 21 in a rear end up slanted orientation. Accordingly, the bracket 19 includes an upper front surface which is sloped (downward toward the front) so as to achieve a planar contact with the opposing surface of the wheel 21a. A substantially frusto-conical spare tire anchor 20 is attached to a central part or a rear part of the front bottom 14a of the spare tire pan 14. Thus, the spare tire 21 is received in the spare tire pan 14 in such a manner that the front end of the tire 21b rests upon the horizontal front bottom 14a immediately behind the rear side of the spare tire pan cross member 8, and the rear end of the tire 21b rests upon the sloped front surface of the bracket 19 while the spare tire anchor 20 projects into the central bore of the wheel 21a. By holding a clamping plate not shown in the drawing against the wheel 21a with a threaded bolt threaded into a nut attached to the spare tire anchor 20, the spare tire 21 can be held fixed in the spare tire pan 14.

A rear seat 22 is supported on an upper side of the middle floor panel 12 via a seat catcher not shown in the drawings, and a fuel tank 23 is disposed in a space under the rear seat 22 defined between the front cross frame portion 10c of the sub frame 10 and middle floor cross member 6. A charcoal canister 24 for absorbing the fuel vapor expelled from the fuel tank 23 is mounted on an underside part of the rear floor panel 13 between the front cross frame portion 10c and rear cross frame portion 10d of the sub frame 10.

The mode of operation of the illustrated embodiment is described in the following. When the vehicle is hit from behind by another vehicle (rear end crash), the impact load applied to the bumper beam 9 is transmitted and distributed to the rear side frames 4 and 5. If the impact load is great, the bumper beam 9, rear side frames 4 and 5 and rear floor panel 13 undergo deformation, and this reduces the impact of the rear end crash which is transmitted to the vehicle occupant.

In the illustrated embodiment, the canister 24 located above the sub frame 10, fuel tank 23 located in front of the sub frame 10 and rear seat located above the fuel tank 23 are required to be protected from damages at the time of a rear end crash. For this purpose, the part of the vehicle body 1 in front of or ahead of the sub frame 10 and spare tire pan cross member 8 is given with a relatively high rigidity.

How the rear vehicle body 1 deforms at the time of a rear end crash is now described in the following with reference to FIGS. 5a to 5c. In an initial phase of a rear end crash illustrated in FIG. 5a, the bumper beam 9 deforms, and displaces the rear panel 15, jack up stiffener 17 and jack up rod 18 forward. Because the part of the vehicle body 1 ahead of the spare tire pan cross member 8 has a relatively high rigidity, the spare tire 21 rotates forward around the front end thereof engaged by the spare tire pan cross member 8, and the rear end of the spare tire 21 is raised upward with the result that the spare tire pan 14 is caused to collapse in the fore-and-aft direction.

More specifically, because the laterally middle part of the rear bottom 14b is reinforced by the jack up stiffener 17 and the jack up rod 18 against deformation, a pronounced deformation occurs at the stepped portion 14e in such a manner that the elevated rear bottom 14b moves forward, and the stepped portion 14e is bent in the form of letter Z as seen from side at the upper and lower folding lines thereof. The bracket 19 is also displaced forward along with the rear bottom 14b, and this pushes the rear part of the spare tire 21 upward until the wheel 21b is disengaged from the spare tire anchor 20. Because the front end of the spare tire 21 is prevented from moving forward by the spare tire pan cross member 8 while the bracket 19 is subjected to a moment in the direction to raise the rear end, the spare tire 21 can be placed into an upright position without being caught between the spare tire pan cross member 8 and rear panel 15.

In an intermediate phase of the rear end crash illustrated in FIG. 5b, the bumper beam 9 and rear panel 15 are displaced even further forward so that the stepped portion 14e is bent in the form of letter Z with the rear bottom 14b being displaced to a position located above the front bottom 14a. In particular, as the jack up stiffener 17 and laterally middle part of the rear bottom 14b ride over or are folded upon the front bottom 14a, the displacement of the front part of the rear bottom 14b includes an upward component.

In a final phase of the rear end crash illustrated in FIG. 5c, the spare tire 21 rises to a fully upright position, and is securely lodged between the spare tire pan cross member 8 and jack up stiffener 17. Therefore, even when the vehicle is hit by a tall vehicle having a front bumper at a relatively high position, the impact of the rear end crash is prevented to be transmitted to the vehicle occupant in the rear seat. Also, because the spare tire pan 14 and related structures are allowed to deform over a relatively large stroke, the impact energy of the crash can be favorably absorbed. Even in the case of a severe rear end crash, the spare tire 21 is put into an upright position, and is effectively supported by both the spare pan cross member 8 and sub frame 10, and the impact load can be evenly distributed to the rear side frames 4 and 5 so that the damages to the vehicle occupant and fuel tank 23 can be minimized.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A rear vehicle body structure, comprising:
   a pair of rear side frames extending in a fore-and-aft direction in a rear part of a vehicle body;
   a rear floor panel attached to and supported by the rear side frames, the rear floor panel defining a spare tire pan that bulges downward between the rear side frames and configured to receive a spare tire therein with a rear end up slanted orientation;
   a spare tire pan cross member extending laterally across a width of the vehicle body immediately ahead of the spare tire pan and having two ends connected to the rear side frames; and
   a reinforcing member attached to a laterally middle part of a rear bottom of the spare tire pan.

2. A rear vehicle body structure, comprising:
   a pair of rear side frames extending in a fore-and-aft direction in a rear part of a vehicle body;
   a rear floor panel attached to and supported by the rear side frames, the rear floor panel defining a spare tire pan that bulges downward between the rear side frames and configured to receive a spare tire therein with a rear end up slanted orientation;

a spare tire pan cross member extending laterally across a width of the vehicle body immediately ahead of the spare tire pan and having two ends connected to the rear side frames; and a reinforcing member attached to a rear bottom of the spare tire pan, and wherein the rear bottom of the spare tire pan is elevated in relation to a front bottom of the spare tire pan.

3. The rear vehicle body structure according to claim 2, wherein the rear bottom comprises an elevated horizontal part and a stepped portion defining a front edge of the elevated horizontal part.

4. The rear vehicle body structure according to claim 2, wherein the spare tire pan comprises a pair of side bottoms that substantially linearly slope downward toward front.

5. The rear vehicle body structure according to claim 2, wherein the reinforcing member comprises a jack up stiffener attached to a lower surface of the rear bottom of the spare tire pan.

6. The rear vehicle body structure according to claim 5, wherein the jack up stiffener includes a rear part that is bent upward and attached to a rear panel of the vehicle body.

7. The rear vehicle body structure according to claim 2, wherein the reinforcing member comprises a bracket attached centrally to an upper surface of the elevated rear bottom of the spare tire pan that has a downward sloping surface engaging a part of a spare tire received in the spare tire pan.

8. The rear vehicle body structure according to claim 2, wherein a spare tire anchor is formed in a central part of the spare tire pan, and the spare tire pan includes a relatively unreinforced part located between the spare tire anchor and the reinforcing member attached to the rear bottom of the spare tire pan.

9. The rear vehicle body structure according to claim 8, wherein the rear bottom comprises an elevated horizontal part, and the relatively unreinforced part comprises a stepped portion defining a front edge of the elevated horizontal part.

* * * * *